US007945381B2

(12) United States Patent
Brynielsson

(10) Patent No.: US 7,945,381 B2
(45) Date of Patent: May 17, 2011

(54) METHOD FOR VEHICLE COMMUNICATION

(75) Inventor: Thore Brynielsson, Kullavik (SE)

(73) Assignee: AB Tryggit, Kullavik (SE)

( * ) Notice: Subject to any disclaimer, the term of this patent is extended or adjusted under 35 U.S.C. 154(b) by 1272 days.

(21) Appl. No.: 10/554,085

(22) PCT Filed: Apr. 23, 2004

(86) PCT No.: PCT/SE2004/000622

§ 371 (c)(1),
(2), (4) Date: Jul. 26, 2006

(87) PCT Pub. No.: WO2004/095391

PCT Pub. Date: Nov. 4, 2004

(65) Prior Publication Data

US 2007/0213923 A1 Sep. 13, 2007

(30) Foreign Application Priority Data

Apr. 23, 2003 (SE) ....................................... 0301175

(51) Int. Cl.
*B29C 45/00* (2006.01)
*G06F 19/00* (2011.01)
*G08G 1/123* (2006.01)

(52) U.S. Cl. ........ 701/200; 701/209; 340/992; 340/994; 340/989

(58) Field of Classification Search .................. 340/992, 340/994, 989; 701/200, 209
See application file for complete search history.

(56) References Cited

U.S. PATENT DOCUMENTS

| | | | | |
|---|---|---|---|---|
| 2,535,162 | A * | 12/1950 | Rodgers | 340/989 |
| 2,972,742 | A * | 2/1961 | Ross | 342/451 |
| 6,037,881 | A | 3/2000 | Bornhauser et al. | |
| 7,015,830 | B2 * | 3/2006 | Flick | 340/989 |
| 2002/0158777 | A1 | 10/2002 | Flick | |
| 2005/0190080 | A1 * | 9/2005 | Flick | 340/989 |
| 2006/0097896 | A1 * | 5/2006 | Jones | 340/994 |
| 2006/0164259 | A1 * | 7/2006 | Winkler et al. | 340/944 |

FOREIGN PATENT DOCUMENTS

WO WO 02/27273 A1 4/2002

* cited by examiner

*Primary Examiner* — Khoi Tran
*Assistant Examiner* — Ian Jen
(74) *Attorney, Agent, or Firm* — Harness, Dickey & Pierce, P.L.C.

(57) ABSTRACT

A method is disclosed for communication between a vehicle travelling along a route and a stationary system. The vehicle is equipped with a communication unit to communicate messages to the stationary system. The method includes dividing the route into a plurality of partial sections, defining for each partial section a required information flow from the vehicle, and adapting the communication to this definition. The method makes it possible to command the communication unit to communicate with correctly adjusted accuracy. This also improves the possibility of effectively utilizing the traffic information in local units, for instance for displays and traffic signals.

15 Claims, 2 Drawing Sheets

METHOD FOR VEHICLE COMMUNICATION

TECHNICAL FIELD

The present invention relates to a method in communication between a vehicle travelling along a route and a stationary system, the vehicle being equipped with a communication unit which communicates messages to the stationary system.

BACKGROUND ART

As an alternative to information systems based on polling of vehicles in a fleet of vehicles (such as buses in a public transport system), AB TRYGGIT has recently developed a system where each vehicle on its own initiates communication with a central unit and, thus, notifies the system of position, speed etc. The system which is disclosed in the Publication WO01/76105 is based on radio communication, where all vehicles transmit messages on the same radio frequency. The need for frequency bands thus is extremely limited, and by frequently transmitting messages from every vehicle, collisions, if any, between messages do not constitute a problem.

In a system of this kind, where update of the information of the system is initiated from the vehicle, it is a matter of vital importance how often such communication is transmitted. If messages are transmitted too infrequently, there is a risk that the system is not sufficiently updated, and moreover the system will be more vulnerable to any message losses.

On the other hand, frequent communications from all vehicles tend to flood the system with radio messages. Although a system according to WO01/76105 is adapted to handle such information excess, it may still put an unnecessary load on the system.

SUMMARY OF THE INVENTION

The object of the present invention is to obviate the above problems and provide a system for traffic information which is updated with sufficient accuracy.

According to the invention, this object is achieved by a method of the type stated by way of introduction, further comprising dividing the route into a plurality of partial sections, defining for each partial section an adaption of the communication, and adapting the communication to this definition.

"Stationary system" can relate to, for instance, stationary radio receivers connected to one or more central units, for collecting information from a plurality of vehicles. However, it may also relate to local units provided with radio receivers which are adapted to receive information from vehicles in the absolute vicinity. Such local units can be suitable to assist in controlling traffic lights and to allow display of information at stops.

The method makes it possible to command the communication unit always to communicate with correctly adjusted accuracy. This also improves the possibility of effectively utilising the traffic information in local units, for instance for displays and traffic signals.

The option of collecting, along certain sections, more frequent information can also be used, for instance, to make a statistical analysis of this section.

In one embodiment, the method comprises creating a set of parameters which define when messages should be sent and/or which contents the messages should have, and making said set available to the communication unit, so that the communication unit is capable of adapting the communication.

A definition of a set of parameters that is made available to the communication method is a simple way to accomplish the invention.

The method may further comprise associating each partial section with one of a plurality of predetermined classes, and determining which class the current partial section is associated with, and adapting the communication according to this class.

This method can be combined with the definition of a set of parameters, but it may also constitute an alternative where the division into differently classified partial sections replaces the parameters.

An important type of adaptation that may be of interest is shifting between time-controlled communication and distance-controlled communication. While time control (for instance a message is transmitted at least every 10th second) may be convenient for sections at a greater distance from planned stops and crossings, distance control (for instance a message is sent at least every 10th meter) may be convenient when a vehicle approaches a stop or crossing.

Of course the message frequency can in both cases be still more adapted, with more frequent messages along critical sections. This occurs in time control by changing a fixed longest time period which is allowed to pass before the next messages are sent, and in distance control by changing a fixed longest section along which the vehicle should travel before the next messages are sent.

Moreover distance control can be more explicit by indicating fixed points along the route at which messages should be sent. This is advantageous if the need for information is associated with predetermined places, such as a crossing.

The adaptation may also comprise indicating an event which is to initiate transmission of a message. As a rule opening or closing of doors initiates transmission of a message, but it may also be appropriate, along certain sections, to let other events recorded by the information system of the vehicle trigger messages. This may involve an accidental stop, a request from a passenger that the vehicle stop at the next stop etc.

Another adaptation may involve the contents of the message. On certain sections limited information (for instance position) may be sufficient, while on other sections more extensive information may be relevant, (for instance position, speed, display of direction of travel etc).

The benefit of the invention will be illustrated with reference to a number of situations related to a public transport system.

As a rule, it is more important for the system to obtain correct and accurately updated information about the vehicle (position, speed etc) in conjunction with a stop, compared with many other parts of the route.

For example, information about the speed of the bus just before the stop can at an early stage indicate whether the bus intends to stop at the current stop or not. This information thus allows earlier update of the information about the bus than would otherwise have been possible.

The partial section preceding the stop can thus be given priority, in which case the communication unit is arranged to communicate, along this section, information about position and speed at frequent intervals, for instance every 5th meter or every two seconds.

In the same way it can be important for the system to be able to determine the status of a bus standing at the stop, for instance if its doors are open or closed. To this end, the communication unit can be arranged to include, in certain places, information whether the doors of the bus are open or closed in every message. The unit can also be arranged to initiate transmission of a message each time the doors of the bus are opened or closed. Consequently this involves a change from time- or distance-controlled transmission to event-controlled transmission.

A further example is a route in conjunction with a crossing with traffic lights. Since crossings controlled by traffic lights frequently cause a sudden change of the rhythm of the traffic (the bus may have to stop), which affects the estimate of the next time of arrival, it is important for the system to receive more information in connection with traffic lights. There is also a further advantage of adapting the behaviour of the communication unit just before a crossing, viz. in connection with intelligent traffic lights. There are prior-art systems where traffic lights are affected by information received from approaching vehicles. In such systems it is necessary somehow to initiate the communication from the vehicle, and this may take place using different types of sensors etc. The present invention presents a simple way of ensuring that the communication unit transmits messages with sufficient frequency and with sufficient contents for the traffic lights to function in a satisfactory manner.

The above described communication at frequent intervals, which thus is applied before a stop, may also be suitable before a traffic light. A slightly different composition of information may also be convenient, which may then involve a different adaptation.

However, it may also be important to obtain reports at some exact places, for instance along a certain section before a crossing, and in the middle of a crossing. The adaptation could therefore imply that a message is sent at certain points along the partial section.

Other adaptations can be convenient in sparsely populated areas. Along such sections, the stationary system typically need not receive information very often, since there will be few events changing a previous estimate of, for instance, the expected time of arrival. It may therefore be appropriate for such a partial section to be associated with a reduction of the frequency of messages, so that messages are sent more infrequently along this section, for instance every 30th second or every kilometer.

Along low-priority partial sections of this type, it may be convenient for the communication unit also to be adapted to send additional messages if certain events should occur. For instance, it may be justified to send a message if the speed of the bus falls below a predetermined value since this indicates some kind of traffic disturbance on the route.

BRIEF DESCRIPTION OF THE DRAWINGS

Particularly preferred embodiments of the present invention will now be described in more detail by way of example and with reference of the accompanying drawings.

DESCRIPTION OF A PREFERRED EMBODIMENT

Figure 1:
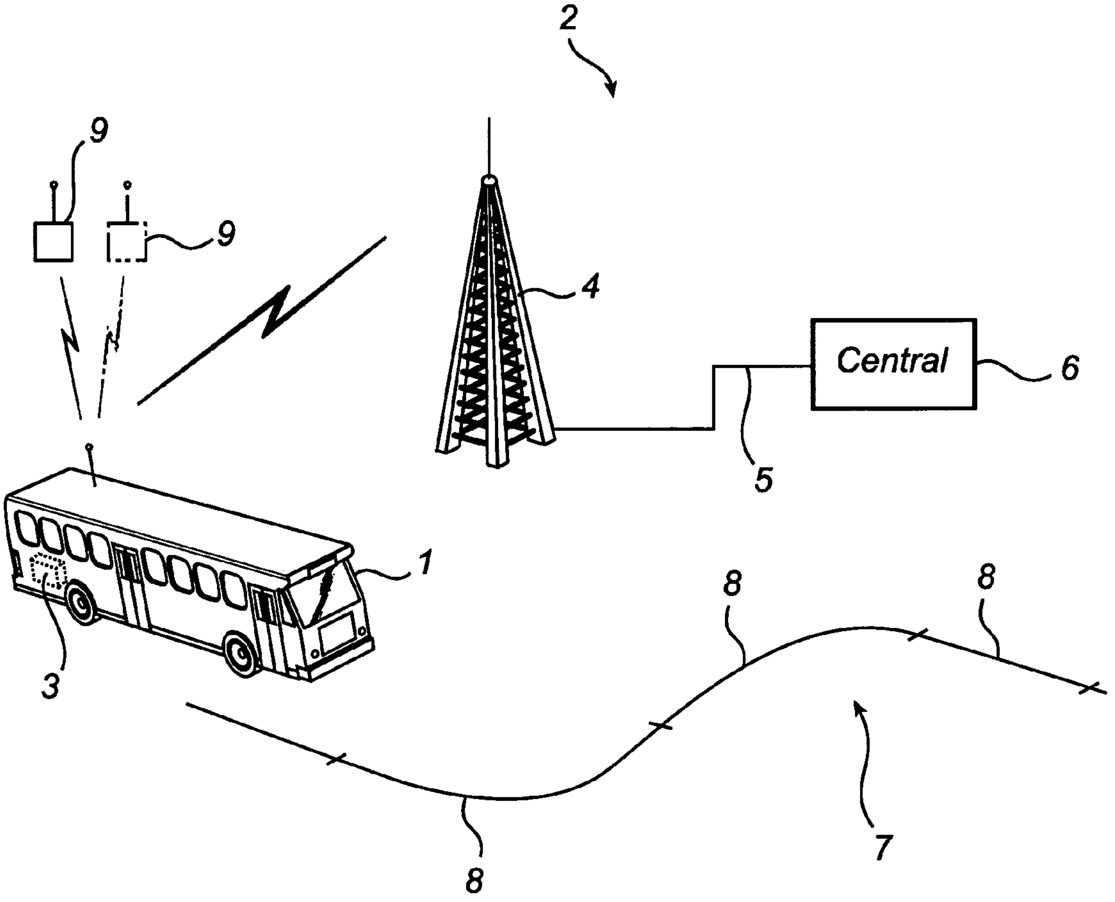
FIG. 1 illustrates schematically an information system for communication according to the invention.

With reference to FIG. 1, the following description concerns communication between a bus 1 serving on a predetermined line and a stationary system 2. To this end, the bus 1 has a communication unit 3 which is adapted to transmit radio messages containing information about speed, position etc. The messages are received by the stationary system 2, which may comprise one or more radio receivers 4 which, via a data network 5 (for instance the Internet), is connected to a central unit 6, for collecting and processing large amounts of information. The stationary system may further comprise local units 9 which are provided with a radio receiver, such as control units for traffic lights or displays at stops. This allows direct transmission of information from a vehicle to such local units.

According to the invention, the route 7 is divided into partial sections 8, which each are associated with a certain desired flow of information from the vehicle 1 to the system 2. This division is made available to the communication unit in the bus, in the same way as the unit knows which stops are included in the route. This can be achieved by preprogramming of the communication unit 3, for instance as described in WO01/76105, which is herewith incorporated by reference. Alternatively, the division can occur from the stationary system 2 and be communicated (for instance broadcasted) to the bus. However, it is essential for the invention that the communication unit 3 be aware of the current division.

In operation, the communication unit 3 is arranged, according to the adaptation as defined for the currently run partial section, to adapt the communication, i.e. the transmissions of messages. It can imply, for instance, that communication is initiated more frequently along certain partial sections, that a message is sent at predetermined places, or that each message that is sent contains more information along certain partial sections. It may also imply that a message is triggered by different events on the different sections.

Figure 2:
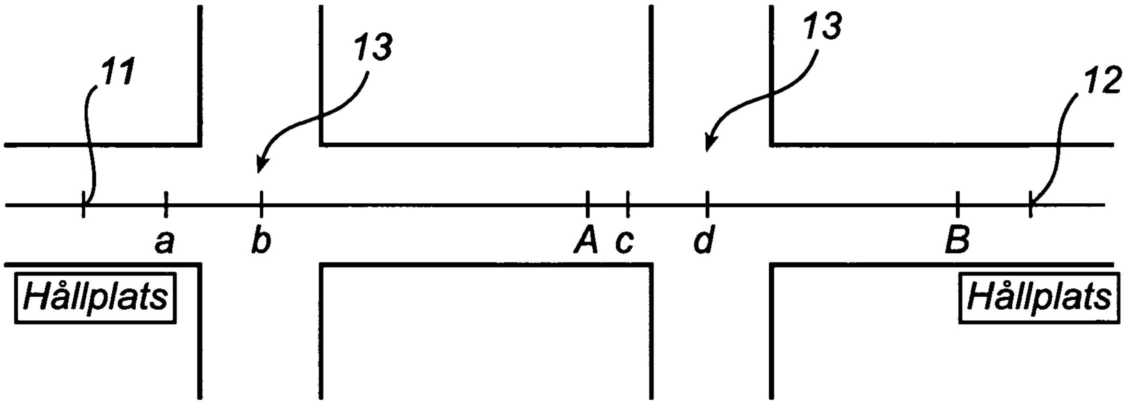
FIG. 2 shows parameterisation of a partial section in an embodiment of the invention.
Figure 3:
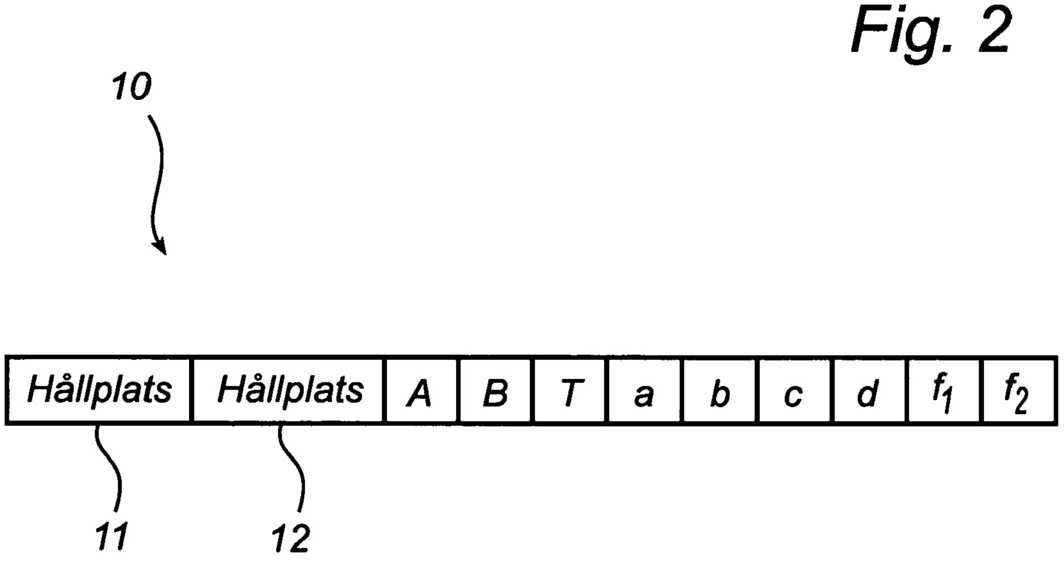
FIG. 3 shows a set of parameters, referred to as a profile.

FIGS. 2-3 show in more detail a method of accomplishing adapted communication.

The partial sections 8 of the route are in this case identical with the sections between the stops 11, 12 along the route, which also passes two crossings 13. In a file, a set of data 10 is stored (see FIG. 3) for each partial section 8 which is given priority, i.e. a partial section along which an adaptation of the information flow should take place. The partial section can be defined in the data set 10 by indicating the preceding (left) stop 11 and the current stop 12 (approached by the bus).

The communication unit 3 is provided with the file containing all relevant data sets and can thus determine whether a currently run section has a defined set of parameters, in which case adaptation of the information flow should take place.

The data set 10 in FIG. 3 may contain two parameters A, B which define a section along which messages are to be sent at shorter time intervals. For example, the parameters may correspond to the distance to the next stop 12. Another parameter T may indicate the longest time between two messages along this section A-B. The time T thus is a form of time-out and represents the longest time that it is allowed to pass before a new message is to be sent. Such a section with more frequent reporting can, as described above, suitably occur just before the current stop.

Correspondingly, distance-controlled message frequency can instead be applied to a selected section. A parameter then represents the longest section that is allowed to pass before a new message is to be sent.

In addition to indicating such a section with more frequent transmission, the data set 10 may also contain parameters (a-d) which indicate a plurality of places along the partial section when messages are always to be sent. This type of distance-related reporting can be advantageous, for example, in connection with crossings with traffic lights. FIG. 2 illustrates parameters a, c which correspond to places just before the crossings 13, and parameters b, d which correspond to places in the middle of the crossings 13.

The set 10 may further contain parameters which indicate different transmission and monitoring frequencies $f_1$, $f_2$ than the frequencies that are usually employed by the communication unit 3. This can be used to increase the reliability of adapted communication.

The result of the above example is that the adapted partial section between the stops 11 and 12 has two segments (section A-B and section a-d) which have a different "class" than the remaining partial section. In the example described above, the section a-d contains points which are specific for the current partial section, but if this need is disregarded, a similar adaptation could be provided by defining in advance a number of classes, and then indicating which partial sections should belong to the respective classes. In this case it may be advantageous to let the partial sections constitute only parts of sections between stops (such as section A-B in FIG. 2).

It is to be noted that the invention does not exclude overlapping partial sections. A classification involving increased information contents does not prevent classification corresponding to increased message frequency. On occasions where both adaptations are active, messages are sent frequently and with increased information contents.

In a situation where two overlapping partial sections with adaptations which, for instance, indicate different message frequency or contents, this can be regulated in a suitable manner. For instance, it is possible to let the highest message frequency rule, or send the union of the different information contents.

In the above examples (FIGS. 2-3) there is no conflict between sections A-B and a-d although they are differently classified. If one of the points a-d is passed at a point of time that falls between two time-controlled transmissions, this simply results in messages being sent slightly more frequently during this period.

It should also be noted that the set of parameters that has been described relate to the adaptation of the information flow according to the invention. Thus, it cannot be excluded that the normal information flow comprises transmission of messages in addition to the parameters in the set 10. For instance, it can be advantageous to transmit messages at predetermined distances to the current stop 12 (for instance 180, 120 and 60 m). This normal information flow does not have to be affected by the set of parameters 10. Alternatively, the set of parameters 10 controls all transmission of messages. It may then be suitable to increase the set 10 with parameters corresponding to the normal occasions of transmission, for instance the above-mentioned transmissions before the current stop.

The invention claimed is:

1. A method for communication between a vehicle travelling along a route and a stationary system, the vehicle including a communication unit to communicate messages to the stationary system, the method comprising:

dividing the route into a plurality of partial sections;

defining for each partial section a required information flow from the vehicle;

creating a set of parameters for each partial section, the set of parameters define at least one of when messages are sent and the contents of the messages, receiving the set of parameters for each partial section at the vehicle communication unit, and adapting the communication based on said parameters, the adapting includes shifting between a time-controlled communication and a distance-controlled communication.

2. A method as claimed in claim 1, further comprising:

communicating, by the stationary system, the set of parameters for each partial section to the vehicle.

3. A method as claimed in claim 1, further comprising:

associating each partial section with one of a plurality of predetermined classes, which each define an adaptation of the information flow; and determining which class each partial section is associated with, and adapting the communication for each partial section according to this class.

4. A method as claimed in claim 1, wherein the adaptation comprises changing a longest time period which is allowed to pass before the next messages are sent.

5. A method as claimed in claim 1, wherein the adaptation comprises changing a fixed longest section along which the vehicle is allowed to travel before the next messages are sent.

6. A method as claimed in claim 1, wherein the adaptation comprises indicating fixed points along the route at which messages are to be sent.

7. A method as claimed in claim 1, wherein the adaptation comprises indicating an event which is to initiate transmission of a message.

8. A method as claimed in claim 1, wherein the adaptation comprises affecting the contents of the message.

9. A method as claimed in claim 2, further comprising:

associating each partial section with one of a plurality of predetermined classes, which each define an adaptation of the information flow; and determining which class each partial section is associated with, and adapting the communication for each partial section according to this class.

10. A method as claimed in claim 2, wherein the adaptation comprises changing a longest time period which is allowed to pass before the next messages are sent.

11. A method as claimed in claim 2, wherein the adaptation comprises changing a fixed longest section along which the vehicle is allowed to travel before the next messages are sent.

12. A method as claimed in claim 2, wherein the adaptation comprises indicating fixed points along the route at which messages are to be sent.

13. A method as claimed in claim 2, wherein the adaptation comprises indicating an event which is to initiate transmission of a message.

14. A method as claimed in claim 2, wherein the adaptation comprises affecting the contents of the message.

15. A method as claimed in claim 2, wherein each message contains information about at least one of vehicle position, vehicle speed and state of the vehicle equipment.

* * * * *